(12) United States Patent
Shreve

(10) Patent No.: US 11,524,473 B1
(45) Date of Patent: Dec. 13, 2022

(54) REINFORCED PRESS BASE, PISTON CAVITY SLEEVE, AND METHOD OF REINFORCING A PRESS BASE

(71) Applicant: US Synthetic Corporation, Orem, UT (US)

(72) Inventor: Shelby M. Shreve, Springville, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 629 days.

(21) Appl. No.: 16/564,165

(22) Filed: Sep. 9, 2019

Related U.S. Application Data

(60) Continuation of application No. 14/546,544, filed on Nov. 18, 2014, now Pat. No. 10,414,113, which is a division of application No. 12/916,018, filed on Oct. 29, 2010, now Pat. No. 8,910,568.

(60) Provisional application No. 61/256,209, filed on Oct. 29, 2009, provisional application No. 61/256,267, filed on Oct. 29, 2009, provisional application No. 61/256,219, filed on Oct. 29, 2009, provisional application No. 61/256,248, filed on Oct. 29, 2009.

(51) Int. Cl.

| B30B 11/00 | (2006.01) |
|---|---|
| B30B 15/04 | (2006.01) |
| B22F 3/15 | (2006.01) |
| B30B 15/28 | (2006.01) |
| B23P 6/02 | (2006.01) |
| B23P 6/04 | (2006.01) |

(52) U.S. Cl.
CPC ............... *B30B 15/04* (2013.01); *B22F 3/15* (2013.01); *B23P 6/02* (2013.01); *B23P 6/04* (2013.01); *B30B 11/004* (2013.01); *B30B 15/28* (2013.01); *Y10T 29/4925* (2015.01); *Y10T 29/49256* (2015.01)

(58) Field of Classification Search
CPC ....... B30B 15/04; B30B 11/004; B30B 15/28; B22F 3/15; B23P 6/02; B23P 6/04; Y10T 29/4925; Y10T 29/49256
See application file for complete search history.

(56) References Cited

U.S. PATENT DOCUMENTS

| 2,177,567 A | 10/1939 | Georges |
| 2,389,818 A | 11/1945 | Rode et al. |
| (Continued) | | |

FOREIGN PATENT DOCUMENTS

CN          2291198 Y    9/1998

*Primary Examiner* — Ryan J. Walters
(74) *Attorney, Agent, or Firm* — Dorsey & Whitney LLP

(57) ABSTRACT

High pressure presses, components for high pressure presses and related methods are provided herein. In one embodiment of the invention, a press base may include a piston cavity formed in the press base and a piston cavity sleeve positioned in the piston cavity. The piston cavity sleeve may include a wall having an outer surface and an inner surface opposite the outer surface. The piston cavity sleeve may further include a floor having an upper surface and a lower surface opposite the upper surface. An outer radius may be formed at a juncture of the outer surface of the wall and lower surface of the floor and an inner radius may be formed at a juncture of the inner surface of the wall and upper surface of the floor. The inner radius may exhibit a radius of curvature that is greater than a radius of curvature of the outer radius.

21 Claims, 7 Drawing Sheets

(56) References Cited

U.S. PATENT DOCUMENTS

| | | |
|---|---|---|
| 2,790,204 A | 4/1957 | Edwards et al. |
| 2,918,699 A | 12/1959 | Hall |
| 2,941,248 A | 6/1960 | Tracy |
| 2,968,837 A | 1/1961 | Alexander et al. |
| 3,063,594 A | 11/1962 | George et al. |
| 3,093,862 A | 6/1963 | George et al. |
| 3,093,863 A | 6/1963 | Helmut |
| 3,159,876 A | 12/1964 | Hall |
| 3,160,089 A | 12/1964 | Platou |
| 3,169,273 A | 2/1965 | Brayman et al. |
| 3,182,353 A | 5/1965 | Hall |
| 3,255,490 A | 6/1966 | Sturm |
| 3,257,688 A | 6/1966 | Levey |
| 3,440,687 A | 4/1969 | Hall |
| 3,783,774 A | 1/1974 | Groos et al. |
| 3,914,078 A | 10/1975 | Kendall |
| 3,922,127 A | 11/1975 | Schwarzkopf |
| 4,153,983 A * | 5/1979 | Stockton ............ F02F 1/004 123/193.2 |
| 4,239,303 A | 12/1980 | Backlin |
| 4,240,342 A | 12/1980 | Delmer |
| 4,302,168 A | 11/1981 | Khvostantsev |
| 4,343,236 A | 8/1982 | Huydts |
| 4,927,345 A | 5/1990 | Takei et al. |
| 4,976,400 A | 12/1990 | Martell et al. |
| 5,253,571 A | 10/1993 | Bielfeldt et al. |
| 5,364,253 A | 11/1994 | Kojima et al. |
| 5,744,170 A | 4/1998 | Hall |
| 5,780,139 A | 7/1998 | Carter et al. |
| 5,851,568 A | 12/1998 | Huang |
| 6,022,206 A | 2/2000 | McNutt |
| 6,186,763 B1 | 2/2001 | Scanlan |
| 6,336,801 B1 | 1/2002 | Fish et al. |
| 6,336,802 B1 | 1/2002 | Hall |
| 6,938,450 B1 | 9/2005 | Zhang et al. |
| 7,150,177 B2 | 12/2006 | Hellgren |
| 7,186,104 B2 | 3/2007 | Hall et al. |
| 7,220,119 B1 | 5/2007 | Kirchmer et al. |
| 7,231,766 B2 | 6/2007 | Hall et al. |
| 7,354,262 B2 | 4/2008 | Hall et al. |
| 7,467,936 B2 | 12/2008 | Hall et al. |
| 7,467,937 B1 | 12/2008 | Hall et al. |
| 7,481,639 B2 | 1/2009 | Hall et al. |
| 7,497,675 B2 | 3/2009 | Hall et al. |
| 7,513,764 B1 | 4/2009 | Hall et al. |
| 7,517,203 B1 | 4/2009 | Hall et al. |
| 7,540,075 B2 | 6/2009 | Sung |
| 7,540,732 B2 | 6/2009 | Hall et al. |
| 7,569,249 B2 | 8/2009 | Hall et al. |
| 7,607,876 B2 | 10/2009 | Hall et al. |
| 7,819,648 B2 | 10/2010 | Yang et al. |
| 8,739,697 B1 | 6/2014 | Shreve |
| 8,857,328 B1 | 10/2014 | Shreve |
| 8,910,568 B1 * | 12/2014 | Shreve ............ B30B 11/004 100/269.18 |
| 10,414,113 B1 * | 9/2019 | Shreve ............ B30B 11/007 |
| 2002/0025354 A1 | 2/2002 | Hall et al. |

* cited by examiner

REINFORCED PRESS BASE, PISTON CAVITY SLEEVE, AND METHOD OF REINFORCING A PRESS BASE

CROSS-REFERENCE TO RELATED APPLICATIONS

The present application is a continuation of U.S. patent application Ser. No. 14/546,544, filed on Nov. 18, 2014, which is a divisional application of U.S. patent application Ser. No. 12/916,018, filed on Oct. 29, 2010, which claims the benefit of U.S. Provisional Patent Application No. 61/256,209 filed Oct. 29, 2009, U.S. Provisional Patent Application No. 61/256,219 filed Oct. 29, 2009, U.S. Provisional Patent Application No. 61/256,248 filed Oct. 29, 2009 and U.S. Provisional Patent Application No. 61/256,267 filed Oct. 29, 2009, the disclosures of each of which are incorporated by reference herein in their entireties.

BACKGROUND

High pressure presses have been used for decades in the manufacture of, for example, synthetic diamond. Such presses are capable of exerting a high pressure and high temperature on a volume of carbonaceous material to reproduce the conditions that create natural diamond inside the earth. Known designs for high pressure presses include, but are not limited to, belt presses, tetrahedral presses, and cubic presses.

FIG. 1 shows a basic design for a conventional cubic press 10 known in the art. The design generally includes six press bases 12, with each press base 12 aligned relative to a common central region 14. Each press base 12 exhibits a generally tapered geometry, having a first face 18 with one cross-sectional area and a second, opposing face 16 exhibiting a cross-sectional area larger than that of the first face 18.

As shown in FIGS. 2 and 3, a piston cavity 20 is formed in the first face or surface 18 of each press base 12 and a piston 22 is disposed therein. Piston 22 may be thrust out of piston cavity 20 and towards common central region 14 shown in FIG. 1 by, for example, the introduction of hydraulic fluid into piston cavity 20. In operation, pistons 22 are displaced out of their associated press bases 12 towards common central region 14 to exert pressure on each face of a cubic volume of carbonaceous material located at common central region 14.

Piston cavity 20 exhibits a generally cylindrical shape and includes a side wall 21 that is generally perpendicular to a bottom 23 of piston cavity 20. Piston cavity 20 also has a small radius 25 providing a curved transition at the juncture of side wall 21 and bottom 23 of piston cavity 20.

Piston 22 is received in piston cavity 20 and has a size and shape approximately equal to the size and shape of piston cavity 20, including a radiused or chamfered edge 27 at a bottom corner of piston 22 to allow clearance of radius 25 in piston cavity 20. Press base 12 includes a fluid input line 24 which extends from an outer side surface 28 of press base 12 to bottom 23 of piston cavity 20. Hydraulic fluid is pumped into piston cavity 20 via fluid input line 24, which then causes piston 22 to be displaced out of piston cavity 20 with a desired amount of force.

As piston 22 is displaced towards common central region 14 and applies pressure to a cubic volume located at common central region 14, counter forces act on piston 22. Counter forces may result from the resistance by the cubic volume as well as the other pistons 22 pushing against the cubic volume from other directions. Ideally, the counter forces are cumulatively balanced. In other words, it is preferable that the magnitude and direction of the forces are such that they counteract one another and focus the force on the central region. Under such conditions, any stress or strain experienced by the components of the cubic press is within predicted design parameters.

However, ideal operation of the cubic press is difficult to achieve due to the many factors. Indeed, some imbalance is typically exhibited between the forces and counter forces distributed among the press bases 12. For example, misaligned components of the cubic press 10 may lead to uneven and misdirected forces and counter forces. Imperfections in the manufacture of components, such as surface imperfections, may also lead to uneven and misdirected counter forces. Additionally, imbalanced hydraulics, whether due to the design of the hydraulics system, improper functioning of hydraulic components, or other inherencies within the system, may result in imbalanced forces within a given press.

Thus, referring to FIG. 4, the desired direction of a counter force is along the same axis A that piston 22 moves along as it is displaced out of piston cavity 20. However, FIG. 4 also illustrates how factors as described above may result in counter forces that combine to act along a different axis B, which is different than the axis along which the pistons are thrust out of the piston cavities.

Uneven and misdirected counter forces may result in detrimental stresses being applied to the components of cubic press 10, including press bases 12. When too much stress is exerted on these components, cracks may begin to form. Once cracks are formed, press bases 12 are weakened and further deformation, crack propagation and component failure become more likely. In other words, cracking and undue bending of components of cubic press 10 can lead to a shorter fatigue life for such components and, thus, more failures of the device, more maintenance and higher operating costs.

Thus, it would be advantageous to provide an improved press base of a high pressure press, improved components for a press base as well as methods of improving a press base of a high pressure press.

SUMMARY

The present disclosure relates to high pressure presses, components of high pressure presses, and to related methods. One embodiment relates to a method for strengthening a piston cavity in a press base of a high pressure press. The method includes providing a press base having a piston cavity formed therein. The piston cavity comprises a piston cavity side wall, a piston cavity floor and an arcuate transition extending between the piston cavity side wall and piston cavity floor. Material is removed from the press base such that a radius of curvature of the arcuate transition is increased. A piston cavity sleeve may be placed in the piston cavity subsequent the removal of material.

In another embodiment of the present invention, a piston cavity sleeve for a press base is provided. The piston cavity sleeve includes a wall having an outer surface and an inner surface opposite the outer surface. The piston cavity sleeve further includes a floor having an upper surface and a lower surface opposite the upper surface. An outer radius is at a juncture of the outer surface of the wall and lower surface of the floor and an inner radius is at a juncture of the inner surface of the wall and upper surface of the floor. The inner radius exhibits a radius of curvature that is greater than a radius of curvature of the outer radius.

In accordance with another embodiment of the present invention, a press base assembly is provided. The press base includes a piston cavity formed in the press base and a piston cavity sleeve positioned generally in the piston cavity. The piston cavity sleeve includes a wall having an outer surface and an inner surface opposite the outer surface. The piston cavity sleeve further includes a floor having an upper surface and a lower surface opposite the upper surface. An outer radius is at a juncture of the outer surface of the wall and lower surface of the floor and an inner radius is at a juncture of the inner surface of the wall and upper surface of the floor. The inner radius exhibits a radius of curvature that is greater than a radius of curvature of the outer radius.

In accordance with another embodiment of the present invention, a method is provided for repairing a press base having a piston cavity formed therein. The method includes removing material from the piston base to increase a radius of a transition from a floor to a side wall of the piston cavity including reducing the size of a crack formed in the piston base and extending from the piston cavity. The method additionally includes inserting a piston cavity sleeve in the piston cavity.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

Figure 1:
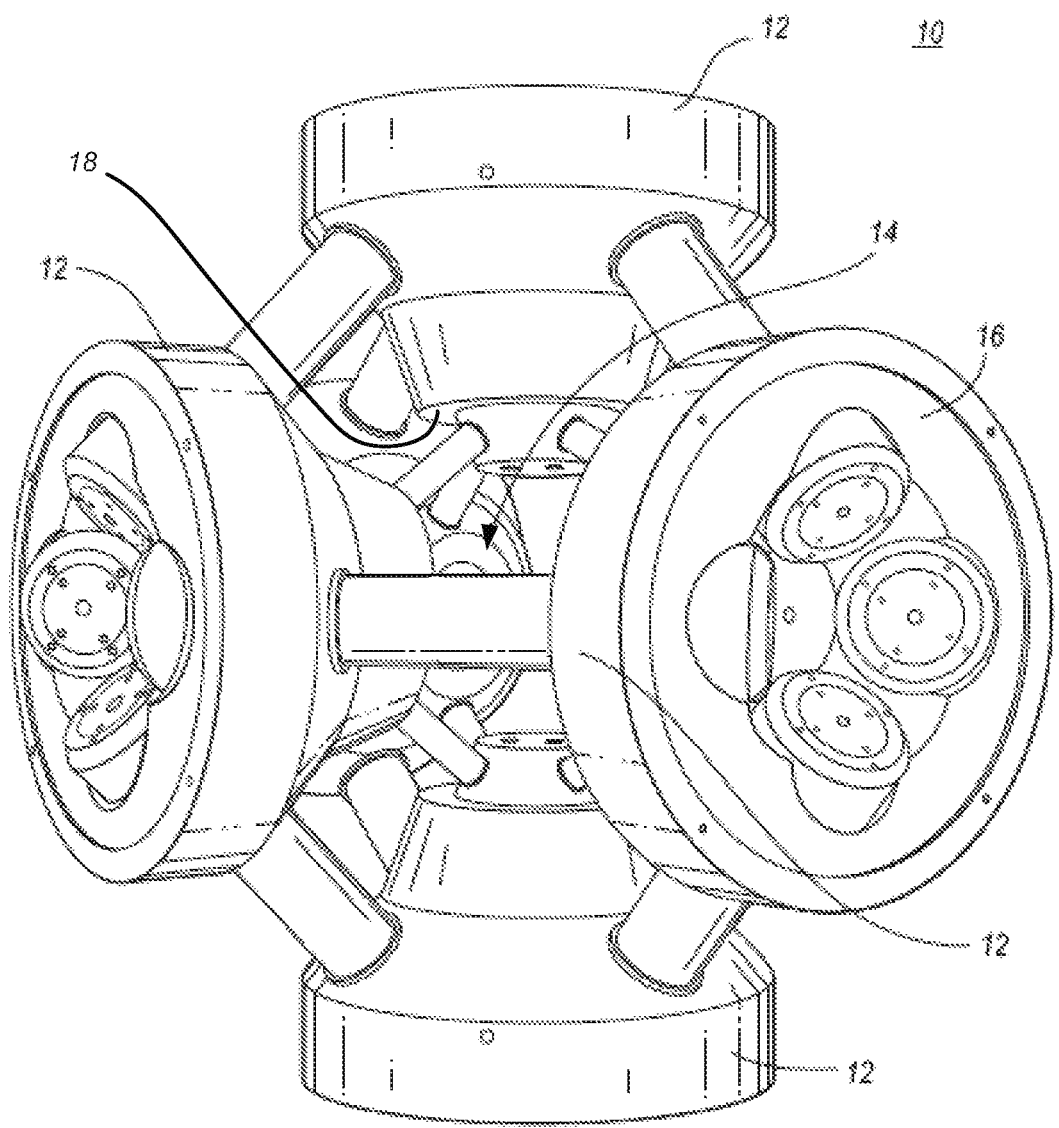
FIG. 1 shows a perspective view of a conventional cubic press known in the art.
Figure 2:
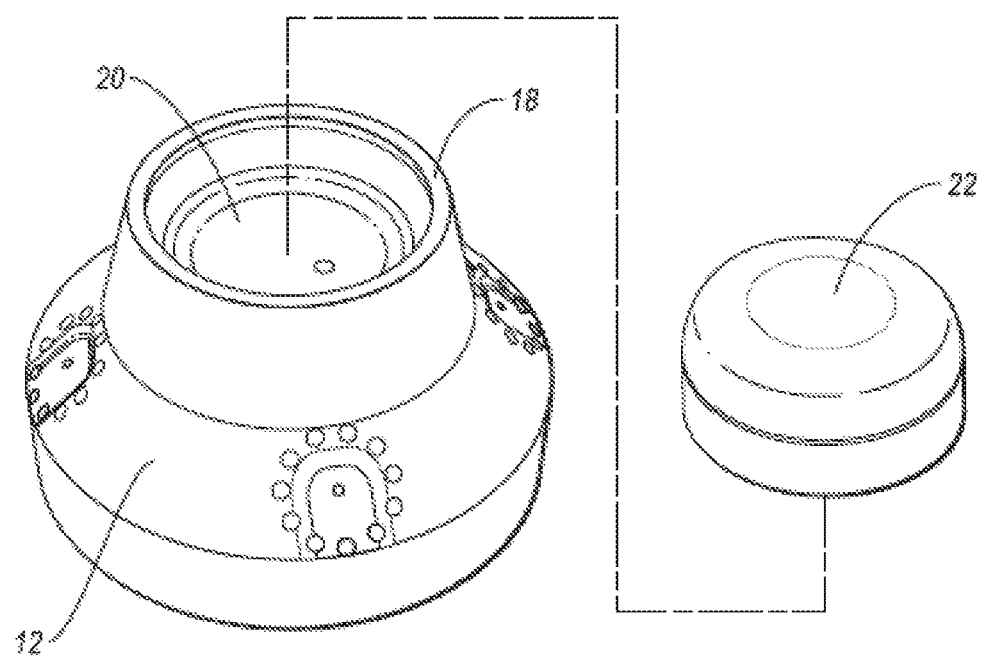
FIG. 2 shows a perspective view of press base and piston known in the art.
Figure 3:
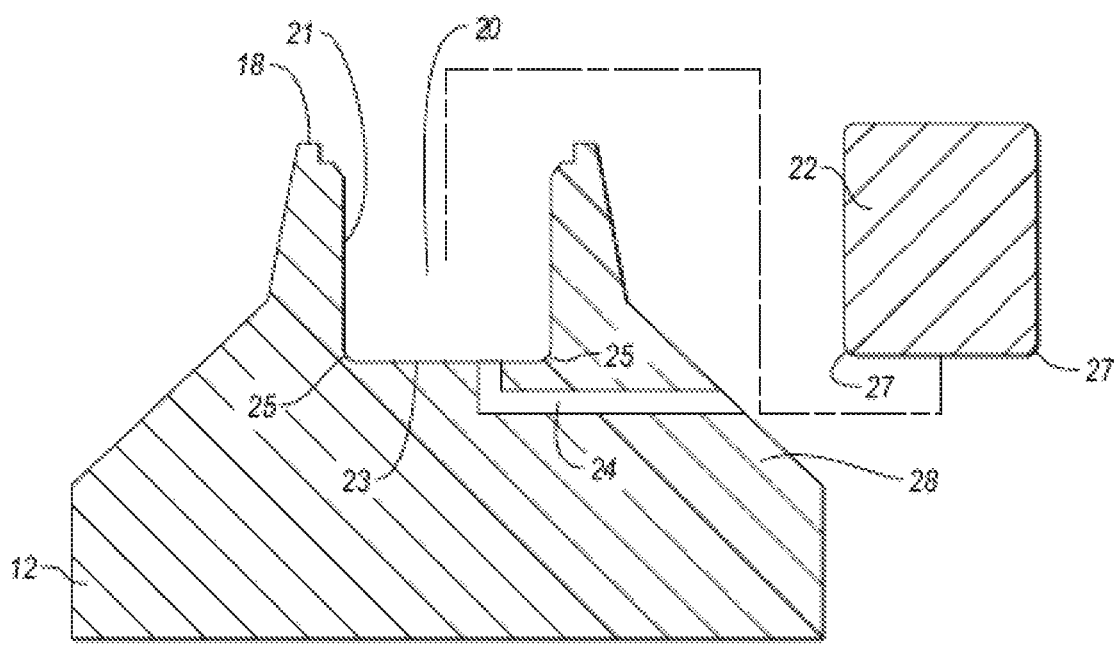
FIG. 3 shows a sectional view of a press base and piston known in the art.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure relates generally to high pressure presses, components for high pressure presses and methods of manufacturing and operating high pressure presses. In one embodiment, a piston cavity sleeve is disclosed for use in high pressure presses. The piston cavity sleeve may have a generally cup-like shape, including a cavity for receiving a piston therein. The piston cavity sleeve may have a shape that conforms to the shape of the piston cavity into which it is deposited. The piston cavity sleeve may include thickened areas at the corners of the piston cavity sleeve which help to reduce stress otherwise developed along the corners of a piston cavity.

For purposes of explaining the features of the piston cavity sleeve, the press base assembly, and the method of strengthening a press base disclosed herein, such are described in the context of a cubic high pressure press (such as shown in FIG. 1). However, the embodiments and features described herein are not limited to use in or with a cubic press configuration. For example, the features disclosed herein could also be used in a tetrahedral press.

Figure 5:
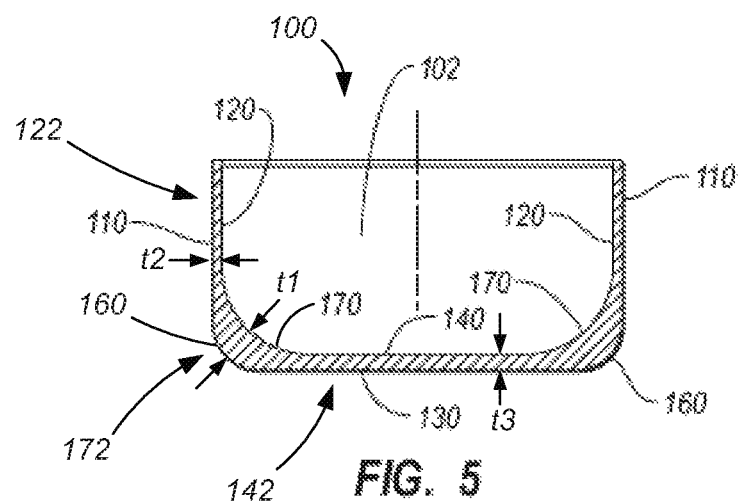
FIG. 5 shows a sectional view of a piston cavity sleeve according an embodiment disclosed herein.

Referring to FIG. 5, a sectional view of a piston cavity sleeve 100 according to one embodiment is shown. Piston cavity sleeve 100 may have a generally cup-like shape defining a cavity 102 for at least partially receiving a piston. Piston cavity sleeve 100 may comprise an outer wall surface 110 and an inner wall surface 120 and an opposite outer wall surface 110, that together define a vertical wall 122 of cup-shaped piston cavity sleeve 100. Piston cavity sleeve 100 may also comprise an outer bottom surface 130 and an inner bottom surface 140 (which is opposite outer bottom surface 130) that together define a horizontal base 142 of cup-shaped piston cavity sleeve 100. Outer wall surface 110 may meet with and transition to outer bottom surface 130 at a juncture having an outer radius 160. Similarly, inner wall surface 120 may meet with and transition to inner bottom surface 140 at a juncture having an inner radius 170. Thus, while outer and inner wall surfaces 110, 120 may be oriented substantially perpendicular to outer bottom surface 130 and inner bottom surface 140, respectively, the juncture of outer wall surface 110 and outer bottom surface 130 and the juncture of inner wall surface 120 and inner bottom surface 140 may be curved or arcuate rather than having sharp angles.

Piston cavity sleeve 100 may be made from any suitable material. In one embodiment, the piston cavity sleeve 100 may be formed from the same material used to form an associated press base. For example, piston cavity sleeve 100 may comprise a metal or a metal alloy (e.g., steel). Such materials may be treated or otherwise tailored to exhibit desired hardness or other material characteristics.

Piston cavity sleeve 100 may also exhibit various heights and widths. In one embodiment, the height and width of piston cavity sleeve 100 may be approximately equal to the depth and width of a piston cavity into which piston cavity sleeve 100 is deposited. In this manner, piston cavity sleeve 100 may fit securely at least partially within the piston cavity. In one embodiment, piston cavity sleeve 100 may be cooperatively configured with an associated piston cavity to exhibit an interference or press fit therebetween.

Figure 6:
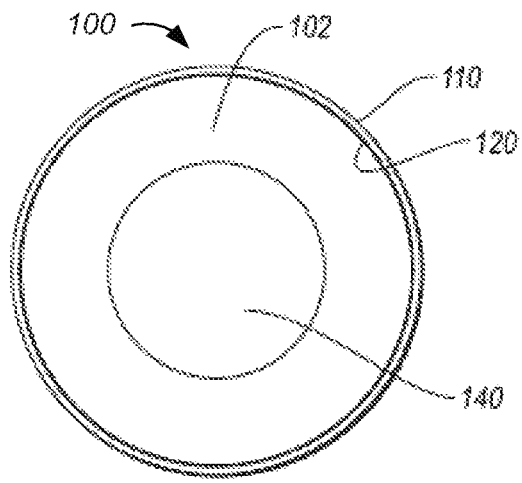
FIG. 6 shows a top down view of a piston cavity sleeve according an embodiment disclosed herein.

Referring briefly to FIG. 6, a top view of piston cavity sleeve 100 is shown. As shown in FIG. 6, piston cavity sleeve 100 may each exhibit a generally circular shape when viewed from this perspective. In such a configuration, outside and inside bottom surfaces 130, 140 may each exhibit circular shapes and outside and inside wall surfaces 110, 120 may exhibit cylindrical shapes. However, the shape of piston cavity sleeve 100 is not limited to a circular or cylindrical shape and may be, for example, elliptical, oval, or polygonal. A piston deposited in piston cavity sleeve 100 may be cooperatively shaped to generally conform to the internal geometry of piston cavity sleeve 100. Similarly, the external geometry of piston cavity sleeve 100 may be shaped to generally conform to the geometry of the piston cavity into which it is deposited.

The distance between outer wall surface 110 and inner wall surface 120 (i.e., the thickness of the wall 122 of piston cavity sleeve 100) is also not limited. For example, the distance may be increased where additional strength at the side walls of piston cavity sleeve 100 is desired. Likewise, the distance between outside bottom surface 130 and inside bottom surface 140 (i.e., the thickness of the base 142 of piston cavity sleeve 100) is also not limited. As illustrated in FIG. 5, the thickness of the base 142 may be greater than the thickness of the wall 122, although in other embodiments these dimensions may be the same or the thickness of the base 142 may be less than the thickness of the wall 122. In one example, the thickness of either the base 142 or the thickness of the wall 122 may range from approximately 0.5 inch to approximately 2.0 inches While not illustrated in FIG. 5, piston cavity sleeve 100 may further comprise a fluid inlet hole (see 232 in FIG. 7) which extends between outside bottom wall surface 130 and inside bottom wall surface 140. Such a fluid inlet hole may be used, e.g., to supply hydraulic fluid into cavity 102. When depositing piston cavity sleeve 100 in a piston cavity formed in a press base, the fluid inlet hole may be aligned with a similar fluid inlet hole formed in the press base.

As noted previously and as illustrated in FIG. 5, the juncture of outside wall surface 110 and outside bottom surface 130 may have a radius of curvature. Similarly, the juncture of inside wall surface 120 and inside bottom surface 140 may have a radius of curvature. Neither outer radius 160 nor inner radius 170 is limited to a specific value, although in one aspect of this embodiment, the radius of curvature for inner radius 170 may be greater than the radius of curvature for outer radius 160. In such an aspect, the junction point 172 or transition extending between the vertical wall 122 of piston cavity sleeve 100 and the horizontal base 142 of piston cavity sleeve 100 may have an increased thickness t1, relative to the thickness t2 of wall 122, the thickness t3 of base 142 (or both), that lends strength to a press base into which piston cavity sleeve 100 is deposited. Additionally, where inner radius 170 is relatively large, the conforming piston deposited therein may have substantially conforming rounded corners that are less likely to generate focused stress to the bottom corners of a piston cavity in a press base. It is noted that the piston may also exhibit other configurations, such as with a chamfered corner rather than a substantially conforming rounding corner.

In one embodiment, the inner radius 170 may exhibit a radius of approximately 5 to 6 inches while the outer radius 160 exhibits a radius of approximately 3 inches. However, such dimensions are determined, at least in part, by the size and geometry of the press base in which the cavity sleeve will be installed as well as the volume of material available for removal from the press base.

Figure 7:
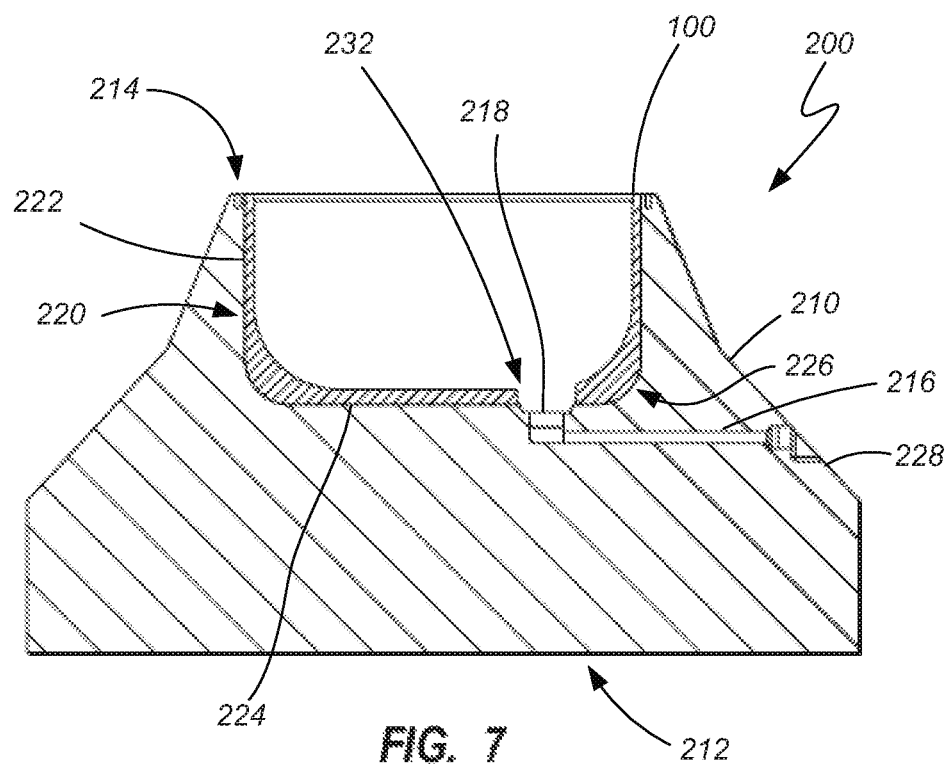
FIG. 7 shows a sectional view of a press assembly according to an embodiment disclosed herein.

Referring now to FIG. 7, a reinforced press base assembly 200. Reinforced press base assembly 200 may include a press base 210 with a piston cavity 220 formed therein. The press base assembly 200 may further comprise a piston cavity sleeve 100 positioned generally in piston cavity 220. Press base 210 may be configured for use in a variety of high pressure presses. Accordingly, the shape and size of press base 210 is not limited. As shown in FIG. 7, the press base 210 may exhibit a generally tapered shape, with a larger outer face surface 212 and a relatively smaller inner face surface 214 located opposite larger outer face surface 212. Press base 210 may be made from any suitable material for use as a press base in a high pressure press, including metals and metal alloys (e.g., steel).

As shown in FIG. 7, piston cavity 220 may be formed into press base 210 with an opening formed in the inner face surface 214. Piston cavity 210 may generally include a piston cavity side wall 222, a piston cavity floor 224 and a piston cavity radius 226 at the juncture of piston cavity side wall 222 and piston cavity floor 224. The size and shape of the piston cavity 220 is not limited. For example, piston cavity 220 may have a generally cup like shape wherein piston cavity floor 224 is circular and piston cavity side wall 222 is substantially perpendicular to piston cavity floor 224 and exhibits a substantially cylindrical geometry.

As shown in FIG. 7, press base 210 may comprise a fluid input line 216 extending between an outer side surface 228 of press base 210 and piston cavity floor 224 of piston cavity 220. Fluid input line 216 may enable fluid to flow from outside press base assembly 200 to inside piston cavity 220. Thus, where a piston is positioned in piston cavity 220, hydraulic fluid may flow through fluid input line 216 to apply pressure to the piston and effect displacement thereof.

As shown in FIG. 7, piston cavity sleeve 100 may be positioned in piston cavity 220. Piston cavity sleeve 100 may have a height and width (or in this case, the diameter) approximately equal to the depth and width (or diameter) of piston cavity 220 such that piston cavity sleeve 100 fits securely in piston cavity 220. Similarly, the radius of curvature for the outer radius 160 (see FIG. 5) of piston cavity sleeve 100 may be approximately equal to radius of curvature 226 of piston cavity 220. Furthermore, piston cavity sleeve 100 may also have a fluid inlet hole 232 extending between an outer bottom surface and an inner bottom surface as described above. In one aspect of this embodiment, when piston cavity sleeve 100 is assembled in piston cavity 220, fluid inlet hole 232 may be aligned with an outlet 218 of fluid input line 216 formed in piston cavity floor 224 of piston cavity 220 to enable hydraulic fluid to enter the piston cavity sleeve 100 and apply pressure to a piston disposed therein.

Figure 4:
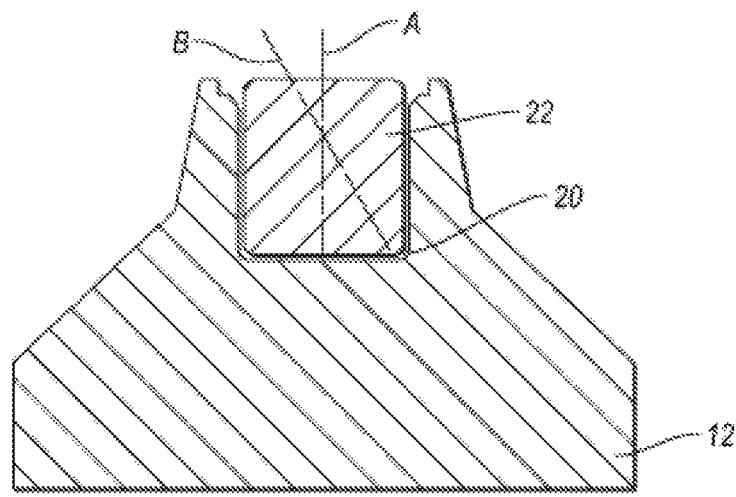
FIG. 4 shows a sectional view of a press base and piston known in the art.

Considering the described embodiments, certain benefits of piston cavity sleeve 100 may be better understood by again referring to FIG. 4 and the action of piston 22 being forced back into piston cavity 20 along axis line B. When traveling along axis line B rather than axis line A, bottom corners of piston 22 may contact the walls and base of piston cavity 20. Further, because of the relatively small radius of curvature at the bottom corners of piston 22 (conforming to the shape of piston cavity 20), the relatively sharp bottom corners of piston 22 may generate further stress concentrations to the press base at the bottom corners of piston cavity 20. Ultimately, application of this type of stress against the bottom corners of piston cavity 20 may result in the formation of cracks in press base 12 at the lower corners of piston cavity 20. Additionally, where cracks have already formed in the press base, these stresses will result in propagation of the existing cracks.

Use of piston cavity sleeve 100 in piston cavity 220 is believed to mitigate such wear and stress issues imposed on the piston cavity when, for example (and referring to FIG. 4), piston 22 is loaded by resultant reaction forces along axis line B. Firstly, the bottom corners of piston cavity 220 are reinforced by the increased thickness of piston cavity sleeve 100 at the juncture or transition 172 of the vertical walls and the horizontal base. Stresses applied to this area may be resisted by the thickness at the junction areas, thereby reducing the chance of crack formation or propagation in a press base 210. Secondly, a piston having a large radius of curvature at its bottom corners which is substantially equal to the radius of curvature of inner radius 170 may be used with piston cavity sleeve 100, thereby eliminating the sharp corners of the pistons used in the prior art. Accordingly, the increased radius of corners of the piston used in conjunction with piston cavity sleeve 100 may be less likely to generate focused stress to the juncture or transition areas 172 of piston cavity sleeve 100 or the underlying junctures of the piston cavity 220.

Figure 8A:
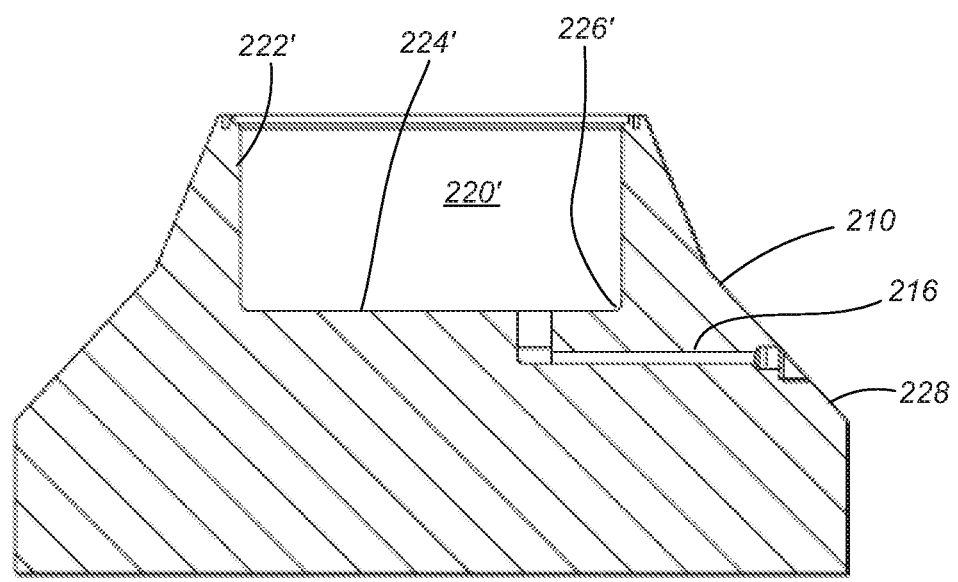
FIG. 8A shows a sectional view of a press base during a first act of a method for strengthening a press base disclosed herein.

Referring now to FIGS. 8A through 8D, a method is disclosed for strengthening a piston cavity in a press base of a high pressure press. (It is noted that the present example is particularly directed to modification of an existing press base 210 and that a new press base could also be manufactured in accordance with various aspects of the process described in association with FIGS. 8A-8D). As shown in FIG. 8A, a press base 210 may have a piston cavity 220' formed therein which extends into press base 210 and forms an opening in the inner face surface 214 of press base 210. Piston cavity 220' may have a piston cavity side wall 222', a piston cavity floor 224', and a radiused junction or transition 226' between piston cavity side wall 222' and piston cavity floor 224' (alternatively, the junction or transition between piston cavity side wall 222' and piston cavity floor 224' may exhibit one or more angles).

FIG. 8A also illustrates that press base 210 may include a fluid input line 216 extending, for example, between an outer side surface 228 of press base 210 and piston cavity floor 224' of piston cavity 220'. The fluid input line 216 may be utilized to provide high pressure fluid (e.g., hydraulic or pneumatic fluid) to the piston cavity to displace an associated piston as has been described above herein.

Figure 8B:
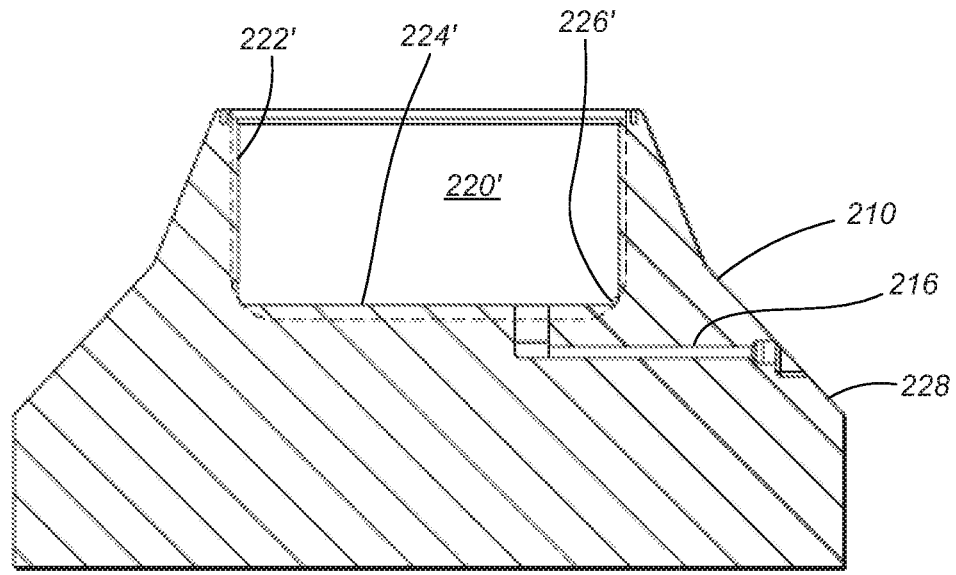
FIG. 8B shows a sectional view of a press base during a second act of a method for strengthening a press base disclosed herein.
Figure 8C:
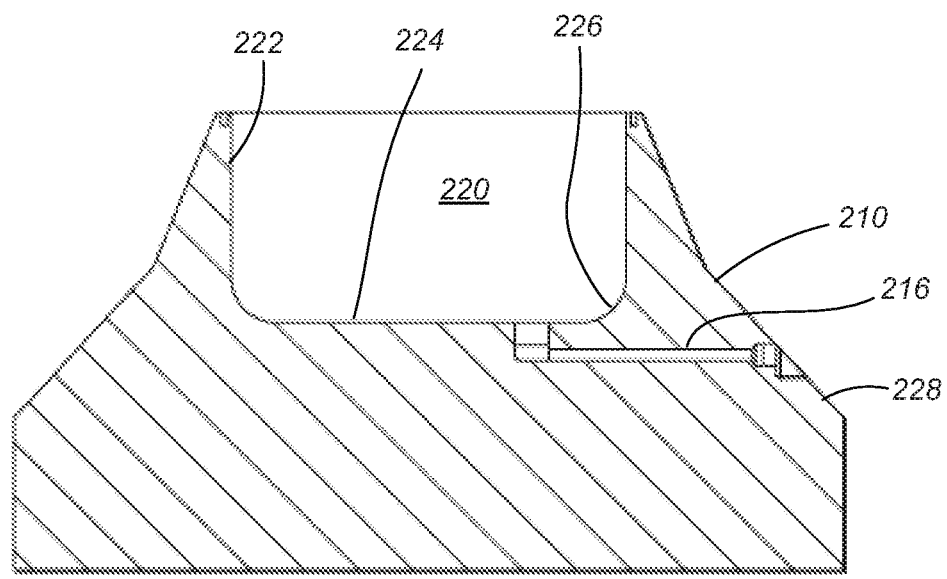
FIG. 8C shows a sectional view of a press base after performing a second act of a method for strengthening a press base disclosed herein.

Referring to FIGS. 8B and 8C, material may be removed from press base 210 and, more specifically, from cavity side walls 222' and piston cavity floor 224' of piston cavity 220' to thereby increase the overall size of piston cavity 220. FIG. 8B indicates, by dashed lines, an example of the material that may be removed from press base 210. Removal of material from press base 210 may be accomplished by any suitable technique such as by milling or other appropriate manufacturing processes. The technique used to remove material from press base 210 may depend on the material from which press base 210 formed. Furthermore, the technique may be one in which precise removal of material may be accomplished so that an enlarged piston cavity 220 (FIG. 8C) having a desired surface finish may be created within desired tolerances of a specified size and geometry.

FIG. 8C illustrates press base 210 after material has been removed from press base 210 (i.e., material has been removed up to the dashed lines shown in FIG. 8B). This results in a newly defined piston cavity 220. Piston cavity 220 may have an increased depth, width and radius of curvature 226. As shown by FIGS. 8B and 8C, material may be removed from the original piston cavity 220' such that the juncture or transition 226 between the piston cavity wall 222 and piston cavity base 224 exhibits an increased radius of curvature. Thus, when comparing piston cavity 220' with piston cavity 220, it can be seen that the transition 226 between piston cavity side wall 222 and piston cavity floor 224 in piston cavity 220 is a more gradual transition as compared to that of piston cavity 220'.

While FIGS. 8B and 8C depict removing material to increase both the width and depth of piston cavity 220, material need not be removed in both directions. For example, material may be removed from press base 210 such that only the width or lateral dimension of piston cavity 220 is increased. In another embodiment, only the depth of the piston cavity may be increased through material removal. Additionally, the overall shape of piston cavity may be maintained or it may be significantly changed upon removal of material.

Figure 8D:
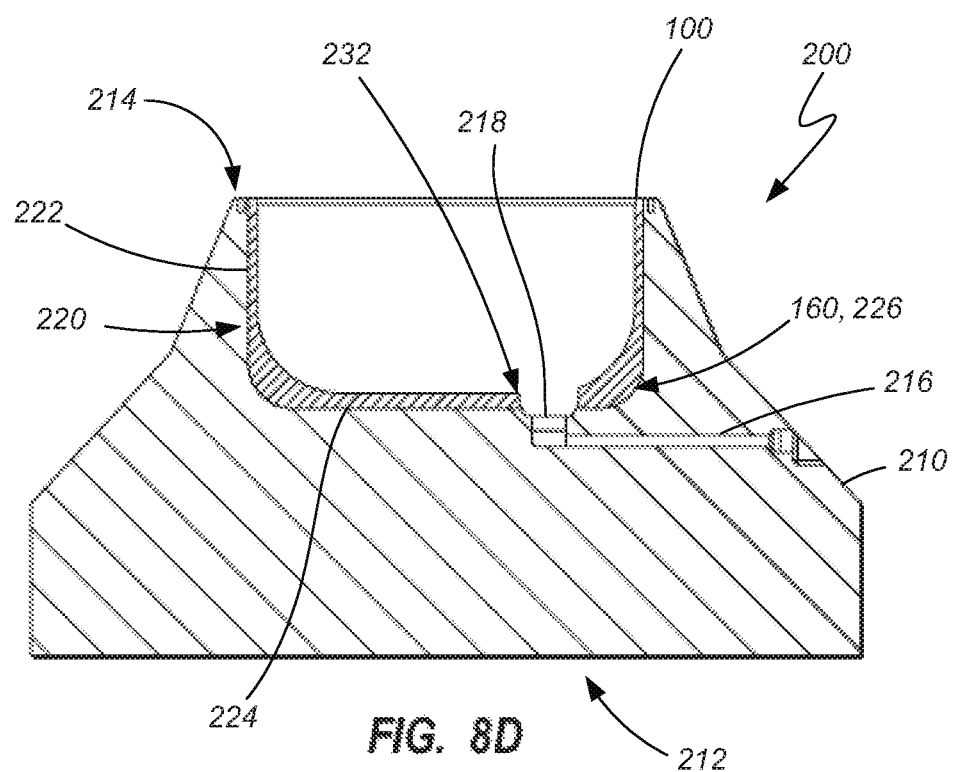
FIG. 8D shows a sectional view of a press base during a third step of a method for strengthening a press base disclosed herein.

Referring now to FIG. 8D, a piston cavity sleeve 100 may optionally be positioned at least partially in piston cavity 220. As previously described, piston cavity sleeve 100 may include an outer wall surface 110, an inner wall surface 120 opposite outer wall surface 110, an outer bottom surface 130, an inner bottom surface 140 opposite outer bottom surface 130, an outer radius 160 at the juncture of outer wall surface 110 and outer bottom surface 130, and an inner radius 170 at the juncture of inner wall surface 120 and inner bottom surface 140 (see FIG. 5). Also as described above, the radius of curvature for inner radius 170 may be greater than the radius of curvature for outer radius 160. It is noted that in another embodiment, press base 210 may be utilized after removing material from the piston cavity and without positioning a cavity sleeve at least partially therein.

Piston cavity sleeve 100 may have a height and an outer width that is approximately equal to the height and width of piston cavity 220 such that piston cavity sleeve 110 is securely positioned in piston cavity 220. Similarly, outer radius 160 may be approximately equal to the radius of curvature for the transition 226 in the piston cavity 220 such that the piston cavity sleeve 100 conforms to the shape of piston cavity 220.

As shown in FIG. 8D, piston cavity sleeve 100 may have a fluid inlet hole 232 extending between outer bottom surface 130 and inner bottom surface 140 as described in greater detail above. When assembling piston cavity sleeve 100 in piston cavity 220, piston cavity sleeve 100 may be positioned such that fluid inlet hole 232 aligns with the outlet 218 of fluid input line 216 in piston cavity floor 224.

Prior to assembling piston cavity sleeve 100 in piston cavity 220, piston cavity sleeve 100 may be cooled in order to "shrink" or reduce some or all of the dimensions of piston cavity sleeve 100. Such cooling may be accomplished by any suitable means. In one example, cooling of piston cavity sleeve 100 may be accomplished by exposing piston cavity sleeve 100 to liquid nitrogen for a period of time. After cooling piston cavity sleeve 100 to reduce the size thereof, piston cavity sleeve 100 may fit into piston cavity 220 without substantial interference. Subsequently, piston cavity sleeve 100 may be returned to ambient temperatures such that it expands and forms a tight interference fit with piston cavity 220. Any suitable means of heating piston cavity sleeve 100 may be used including, for example, exposure to an ambient temperature for a desired time. In another embodiment, the press base 210 may be heated to expand the piston cavity 220 prior to assembly with the piston cavity sleeve 100. In yet another embodiment, both the press base 210 may be heated and the piston cavity sleeve 100 may be cooled prior to assembly.

Other mechanisms for securing piston cavity sleeve 100 within piston cavity 220 may also be used. For example, bolts, screws, welding, adhesives or other joining techniques may be used to secure piston cavity sleeve 100 within piston cavity 220. Such securing techniques may be used in addition to or as an alternative to the interference techniques described hereinabove.

Figure 9:
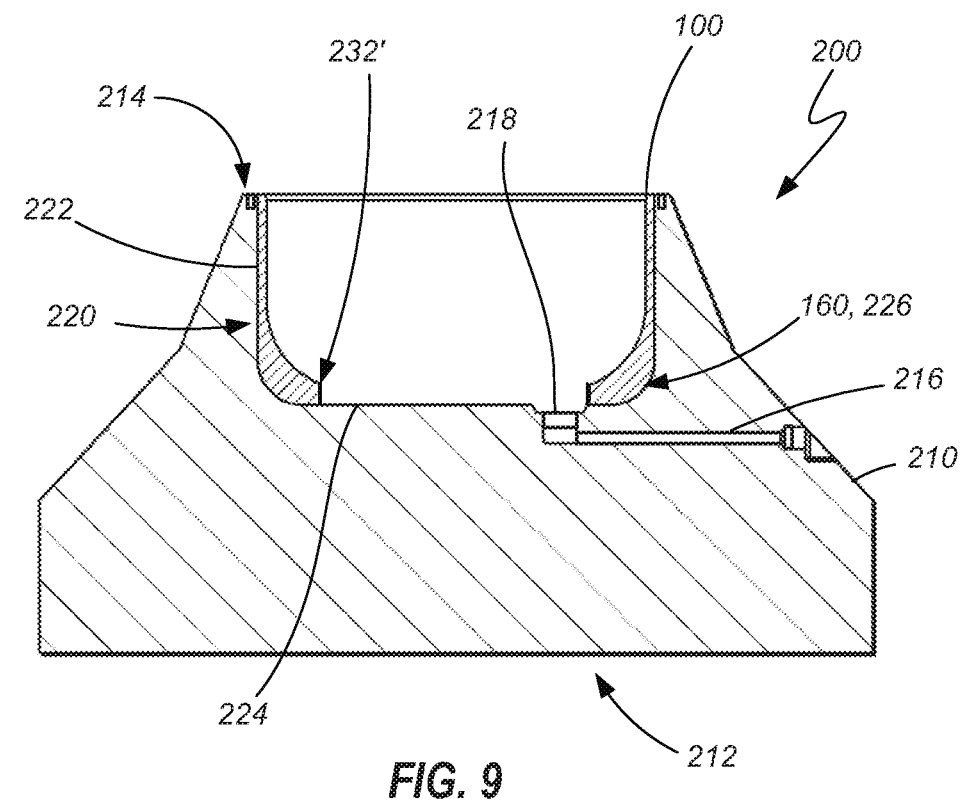
FIG. 9 shows a sectional view of a press base in accordance with another embodiment of the present invention.

Referring briefly to FIG. 9, another embodiment is shown similar to that described with respect to FIGS. 8A and 8D. As seen in FIG. 9, a piston cavity sleeve 100 may be positioned at least partially in piston cavity 220. As previously described, piston cavity sleeve 100 may include an outer wall surface 110, an inner wall surface 120 opposite outer wall surface 110, an outer bottom surface 130, an inner bottom surface 140 opposite outer bottom surface 130, an outer radius 160 at the juncture of outer wall surface 110 and outer bottom surface 130, and an inner radius 170 at the juncture of inner wall surface 120 and inner bottom surface 140 (see FIG. 5). Also as described above, the radius of curvature for inner radius 170 may be greater than the radius of curvature for outer radius 160.

Piston cavity sleeve 100 may have a height and an outer width that is approximately equal to the height and width of piston cavity 220 such that piston cavity sleeve 110 may be securely positioned in piston cavity 220. Similarly, outer radius 160 may be approximately equal to the radius of curvature for the transition 226 in the piston cavity 220 such that the piston cavity sleeve 100 substantially conforms to the shape of piston cavity 220.

As shown in FIG. 9, piston cavity sleeve 100 may have a fluid inlet hole 232' extending between outer bottom surface 130 and inner bottom surface 140 as described in greater detail above. Fluid inlet hole 232' may be sized and configured so as to avoid substantial issues of aligning fluid inlet hole 232' with outlet 218 of fluid input line during assembly of the piston cavity sleeve 100 with the piston cavity 220. For example, fluid inlet hole 232' may exhibit a radius or cross-sectional opening that is large enough so that outlet 218 is exposed therethrough regardless of the radial orientation of piston cavity sleeve 110 within piston cavity 220. Such a configuration may save time and effort during manufacture of piston cavity sleeve 100 as well as during assembly of piston cavity sleeve 100 with piston cavity 220.

The above described methods may be used prior to the formation of cracks in press base 210 to thereby prevent the formation of cracks in press base 210. The above described methods may also be used after cracks have formed in press base 210 to prevent the propagation of existing cracks in press base 210. In such a case, removal of the material may be controlled so as to effectively remove, or at least reduce the size of, existing cracks in the press base. Thus, embodiments of the present invention may be used to repair or salvage press bases that would otherwise be considered irreparable or unusable.

While certain embodiments and details have been included herein for purposes of illustrating aspects of the instant disclosure, it will be apparent to those skilled in the art that various changes in systems, apparatus, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A method of assembling a piston cavity sleeve and a press base, the press base having a piston cavity formed therein, the method comprising:
   removing material from the press base to increase a radius of a transition from a piston cavity floor to a piston cavity side wall; and
   inserting the piston cavity sleeve at least partially in the piston cavity, the piston cavity sleeve including:
      a sleeve wall having a sleeve outer surface and a sleeve inner surface opposite the sleeve outer surface;
      a sleeve outer radius transitioning from a sleeve outer wall surface to a lower surface of a sleeve floor; and
      a sleeve inner radius transitioning from a sleeve inner wall surface to an upper surface of the sleeve floor;
   wherein a radius of curvature of the sleeve inner radius is greater than a radius of curvature of the sleeve outer radius.

2. The method according to claim 1, wherein increasing the radius of the transition includes increasing the radius to approximately 3 inches.

3. The method according to claim 1, further comprising substantially conforming an outer surface of the piston cavity sleeve to the piston cavity side wall, piston cavity floor and the transition of the piston cavity.

4. The method according to claim 1, further comprising aligning an opening in the piston cavity sleeve with a fluid outlet formed in the piston cavity.

5. The method according to claim 1, wherein inserting a piston cavity sleeve at least partially in the piston cavity includes providing an interference fit between the piston cavity sleeve and the piston cavity.

6. The method according to claim 1, wherein a ratio of the radius of curvature of the sleeve inner radius to the radius of curvature of the sleeve outer radius is approximately 2 to 1.

7. The method according to claim 1, wherein removing material from the press base to increase a radius of the transition from the piston cavity floor to the piston side wall includes increasing the radius of the transition to be substantially equal to the radius of curvature of the sleeve outer radius.

8. The method according to claim 7, wherein the radius of curvature of the sleeve inner radius is at least approximately 5 inches and the radius of curvature of the sleeve outer radius is approximately 3 inches.

9. The method according to claim 1, wherein:
   the sleeve wall exhibits a thickness between approximately 0.5 inch and approximately 2.0 inches; or
   the sleeve floor exhibits a thickness between approximately 0.5 inch and approximately 2.0 inches.

10. The method according to claim 1, wherein:
   the sleeve inner surface exhibits a cylindrical geometry; and
   the sleeve inner surface is perpendicular to the upper surface of the sleeve floor.

11. The method according to claim 1, wherein the piston cavity sleeve exhibits a thickness measured between the inner radius and outer radius that is greater than a thickness measured between the upper surface and the lower surface of the sleeve floor.

12. The method according to claim 1, wherein the piston cavity sleeve exhibits a thickness measured between the sleeve inner radius and sleeve outer radius that is greater than a thickness measured between the sleeve inner surface and the sleeve outer surface.

13. The method according to claim 1, wherein the piston cavity sleeve exhibits a distance between the lower surface of the sleeve floor and the upper surface of the sleeve floor that is larger than a distance between the sleeve inner surface and the sleeve outer surface.

14. The method according to claim 1, wherein inserting the piston cavity sleeve at least partially in the piston cavity includes inserting the piston cavity sleeve comprising steel at least partially in the piston cavity.

15. A method of repairing a press base having a piston cavity formed therein, the method comprising:
removing material from the press base to increase a radius of a transition from a piston cavity floor to a piston cavity side wall including reducing the size of a crack formed in the press base; and
inserting a piston cavity sleeve at least partially in the piston cavity, wherein the piston cavity sleeve includes:
a sleeve wall having a sleeve outer surface and a sleeve inner surface opposite the sleeve outer surface;
a sleeve outer radius transitioning from a sleeve outer wall surface to a lower surface of a sleeve floor; and
a sleeve inner radius transitioning from a sleeve inner wall surface to an upper surface of the sleeve floor.

16. The method according to claim 15, wherein
a radius of curvature of the sleeve inner radius is greater than a radius of curvature of the sleeve outer radius.

17. The method according to claim 16, wherein removing material from the press base to increase a radius of the transition from the piston cavity floor to the piston side wall includes increasing the radius of the transition to be substantially equal to the radius of curvature of the sleeve outer radius.

18. The method according to claim 15, wherein inserting the piston cavity sleeve at least partially in the piston cavity includes providing an interference fit between the piston cavity sleeve and the piston cavity.

19. The method according to claim 15, wherein the piston cavity sleeve exhibits a thickness measured between the inner radius and outer radius that is greater than a thickness measured between the upper surface and the lower surface of the sleeve floor.

20. The method according to claim 15, wherein the piston cavity sleeve exhibits a thickness measured between the sleeve inner radius and sleeve outer radius that is greater than a thickness measured between the sleeve inner surface and the sleeve outer surface.

21. The method according to claim 15, wherein the piston cavity sleeve exhibits a distance between the lower surface of the sleeve floor and the upper surface of the sleeve floor that is larger than a distance between the sleeve inner surface and the sleeve outer surface.

* * * * *